United States Patent
Yakabe et al.

(10) Patent No.: US 7,798,120 B2
(45) Date of Patent: Sep. 21, 2010

(54) VARIABLE AIR INTAKE DEVICE FOR INTERNAL COMBUSTION ENGINE

(75) Inventors: Yoshinori Yakabe, Yokohama (JP); Junya Sasaki, Yokohama (JP); Hitoshi Jinno, Yokohama (JP); Mike Martin, Nashville, MI (US)

(73) Assignees: Nissan Motor Co., Ltd., Yokohama-shi (JP); Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 11/625,461

(22) Filed: Jan. 22, 2007

(65) Prior Publication Data

US 2007/0175432 A1 Aug. 2, 2007

(30) Foreign Application Priority Data

Jan. 23, 2006 (JP) ............................. 2006-013533

(51) Int. Cl.
    *F02B 31/00* (2006.01)

(52) U.S. Cl. .................. 123/308; 123/184.57; 123/309; 251/148; 251/306

(58) Field of Classification Search .................. 123/308, 123/184.57, 184.49, 184.36, 184.44, 295, 123/299, 301, 300; 251/148, 306, 308, 315.01; F02B 31/00

See application file for complete search history.

(56) References Cited

U.S. PATENT DOCUMENTS

| 3,642,247 | A | * | 2/1972 | Scaramucci ................. 251/148 |
| 4,794,886 | A | * | 1/1989 | Iwamuro et al. ........ 123/184.49 |
| 5,027,753 | A | * | 7/1991 | Hamazaki et al. ....... 123/184.31 |
| 5,133,308 | A | * | 7/1992 | Hitomi et al. .......... 123/184.31 |
| 7,131,416 | B2 | * | 11/2006 | Sasaki et al. ............ 123/184.36 |
| 7,270,102 | B2 | * | 9/2007 | Tanikawa et al. ........ 123/184.42 |
| 2002/0195076 | A1 | * | 12/2002 | Nomizo et al. .......... 123/184.57 |

FOREIGN PATENT DOCUMENTS

| JP | 6-2625 A | 1/1994 |
| JP | 2003-3853 A | 1/2003 |
| JP | 2003-336553 A | 11/2003 |
| JP | 2005-127252 A | 5/2005 |

\* cited by examiner

*Primary Examiner*—Stephen K Cronin
*Assistant Examiner*—Keith Coleman
(74) *Attorney, Agent, or Firm*—Foley & Lardner LLP

(57) ABSTRACT

A pair of intake collectors (1A, 1B) separated by a partition (4A) aspirates air into each cylinder of a multi-cylinder internal combustion engine via branch pipes (3A-3F). A valve (8A, 8B) which shuts off the air flow between the intake collectors (1A, 1B) is fitted onto the partition (4A) via a valve frame (11) and a bearing boss (16A) provided on the valve frame (11). An edge of the partition (4A) is fitted into a groove (18) formed on the outer circumference of the valve frame (11) so as to prevent air from leaking through an engaging part between the partition (4A) and the valve frame (11) due to a Labyrinth effect. Further, an elastically connecting member (20) disposed on both sides of the bearing boss (16A) elastically connects the valve frame (11) and the groove (18), thereby preventing relative oscillation between the partition (4A) and the valve frame (11).

13 Claims, 4 Drawing Sheets

VARIABLE AIR INTAKE DEVICE FOR INTERNAL COMBUSTION ENGINE

FIELD OF THE INVENTION

This invention relates to a variable intake device which connects and disconnects a pair of intake collectors via a control valve unit to improve a charging efficiency of an internal combustion engine, and more specifically to improve the air blocking performance of the control valve unit.

BACKGROUND OF THE INVENTION

JPH06-002625A published by the Japan Patent Office in 1994 proposes a variable intake device for a spark ignition multi-cylinder internal combustion engine. The variable intake device alternates between inertial charging and resonance charging to improve the charging efficiency of the engine.

The variable intake device comprises a pair of intake collectors, a communication passage connecting the pair of intake collectors, and a control valve unit which opens and closes the communication passage. When the rotation speed of the engine is higher than a threshold, the control valve unit opens the communication passage and the engine aspirates air under an inertial effect of intake air. When the rotation speed of the engine is not higher than the threshold, the control valve unit closes the communication passage and the engine aspirates air under a resonance effect of the pair of isolated intake collectors.

Each of the intake collectors supplies air via branch pipes to engine cylinders in which ignition does not take place successively. The communication passage is formed, for example by molding an aluminum alloy as an independent communication passage structure. The control valve unit is constituted by a butterfly type valve body formed about a valve shaft, and bearing bosses formed on the communication passage structure for supporting the valve shaft so as to be free to rotate.

SUMMARY OF THE INVENTION

Since the resonance effect is accompanied by pressure pulsation, the control valve unit in a closed position has to block the flow of air between the collectors securely so as not to damp the resonance effect.

The bearing boss supporting the valve shaft and a valve frame into which the butterfly type valve body fits are formed by implementing mechanical processing on the communication passage structure made of an aluminum alloy mold. In order to obtain favorable air-tightness in the control valve unit when in the closed position, the mechanical processing must be performed with a high degree of precision. As a result, the prior art device suffers from high manufacturing cost.

It is therefore an object of this invention to improve the air blocking performance of the control valve unit while maintaining a simple construction.

In order to achieve the above object, this invention provides a variable intake device for a multi-cylinder internal combustion engine. The device comprises a pair of intake collectors respectively branching off branch pipes to cylinders of the engine, a partition which separates the pair of intake collectors, and a valve which connects the pair of intake collectors.

The valve is fitted onto the partition via a valve frame and a bearing boss provided on the valve frame, and one of the partition and the valve frame has a groove to engage with an edge of the other of the partition and the valve frame.

The device further comprises an elastically connecting member which elastically connects the groove and the edge in a state where the groove and the edge are engaged, at points on both sides of the bearing boss.

The details as well as other features and advantages of this invention are set forth in the remainder of the specification and are shown in the accompanying drawings.

DESCRIPTION OF THE PREFERRED EMBODIMENTS

Figure 1:
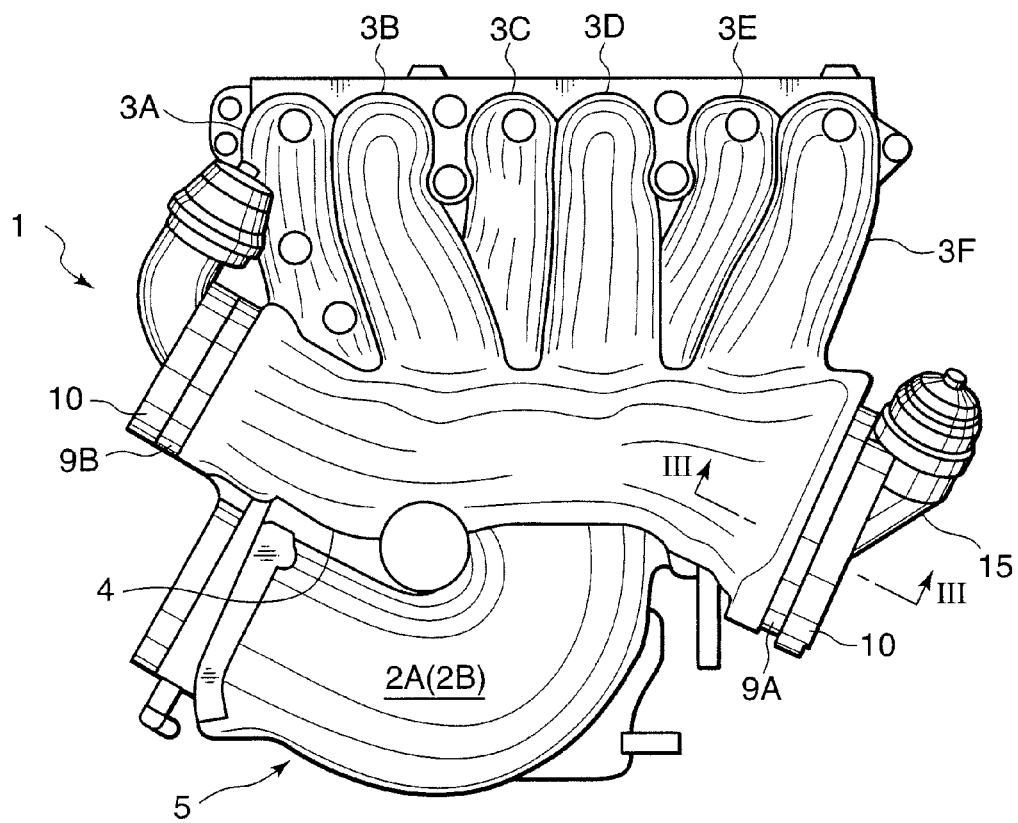
FIG. 1 is a plan view of an intake manifold of an internal combustion engine to which this invention is applied.

Referring to FIG. 1 of the drawings, an intake manifold 1 of a spark ignition multi-cylinder internal combustion engine comprises a collector part 4, an intake pipe 5, and six branch pipes 3A-3F.

The internal combustion engine comprises six cylinders named #1 to #6.

Figure 3:
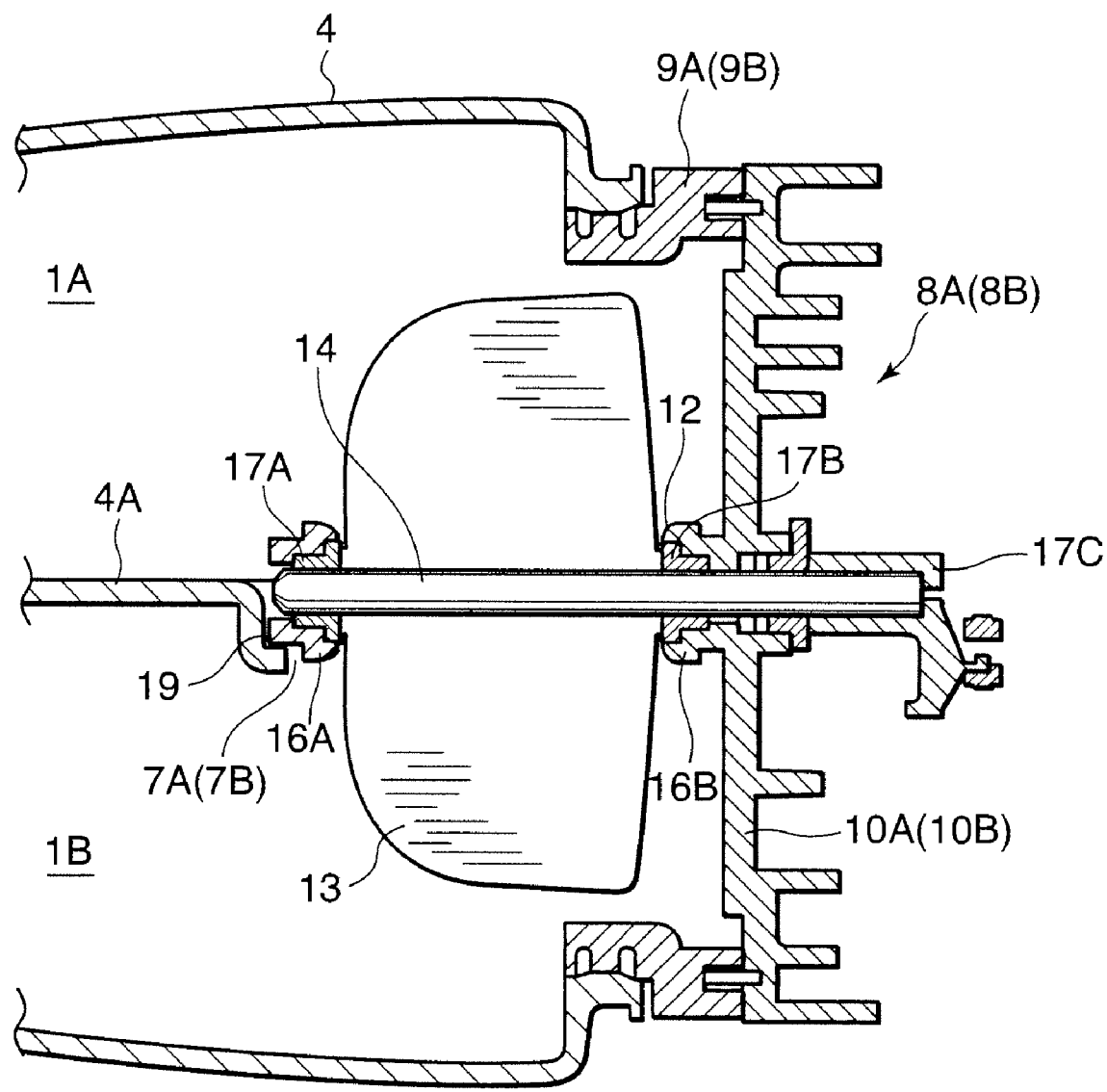
FIG. 3 is a sectional view of a control valve unit according to this invention, taken along the line III-III in FIG. 1.

Referring to FIG. 3, the interior of the collector part 4 is divided into a pair of intake collectors 1A and 1B by a partition 4A. The collector part 4 thus constitutes a housing of the intake collectors 1A and 1B.

Figure 2:
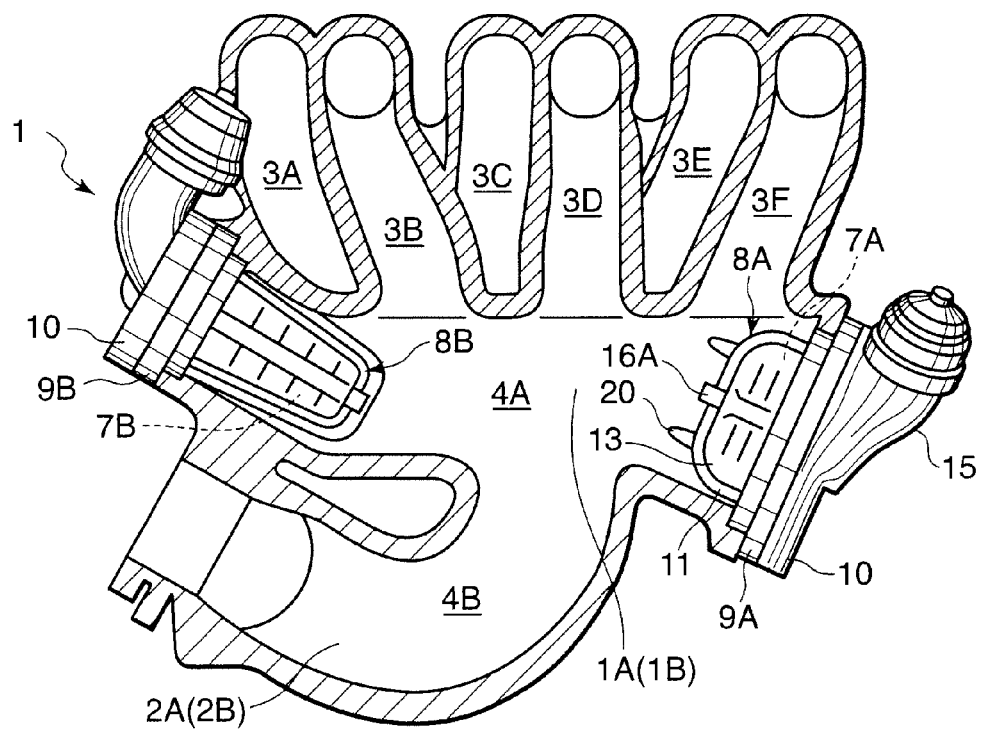
FIG. 2 is a horizontal sectional view of the intake manifold.

Referring to FIG. 2, the intake pipe 5 is divided into intake passages 2A and 2B by a partition 4B which is continuous with the partition 4A. The branch pipes 3A, 3C and 3E open onto the inner space of the intake collector 1A and the branch pipes 3B, 3D and 3F open onto the inner space of the intake collector 1B.

The intake collector 1A supplies air which is aspirated through the intake passage 2A to three cylinders of the internal combustion engine via the branch pipes 3A, 3C and 3E. The intake collector 1B supplies air which is aspirated through the intake passage 2B to the other three cylinders of the internal combustion engine via the branch pipes 3B, 3D and 3F. The three cylinders to which the intake collector 1A supplies air are chosen such that ignition does not take place successively in the chosen cylinders. Similarly, the three cylinders to which the intake collector 1B supplies air are chosen such that ignition does not take place successively in the chosen cylinders. Herein, the branch pipes 3A, 3C, and 3E are respectively connected to the cylinders #1, #3, and #5, and the branch pipes 3B, 3D, and 3F are respectively connected to the cylinders #2, #4, and #6. The intake passages 2A and 2B are respectively connected to air cleaners via throttles.

The intake manifold 1 is formed into one piece in advance by injection molding a polymer synthetic resin such as Nyron® with a high degree of dimensional precision.

A first notch 7A and a second notch 7B which connect the intake collector 1A to the intake collector 1B are formed at either end of the partition 4A.

A first control valve 8A which opens and closes the first notch 7A is fitted to the partition 4A. A second control valve 8B which opens and closes the second notch 7B is fitted to the partition 4B.

Referring again to FIG. 3, the first control valve 8A comprises a fixing flange 10A. The first control valve 8A is fixed to the collector part 4 by securing the fixing flange 10A using bolts to a flange 9A that is fixed in advance to an opening of the collector part 4. Similarly, the second control valve 8B is fixed to the collector part 4 by securing a fixing flange 10B by bolts onto a flange 9B fixed in advance to another opening of the collector part 4.

Since the structures of the first control valve 8A and the second control valve 8B are identical, the description below is provided with respect to the first control valve 8A.

Figure 4:
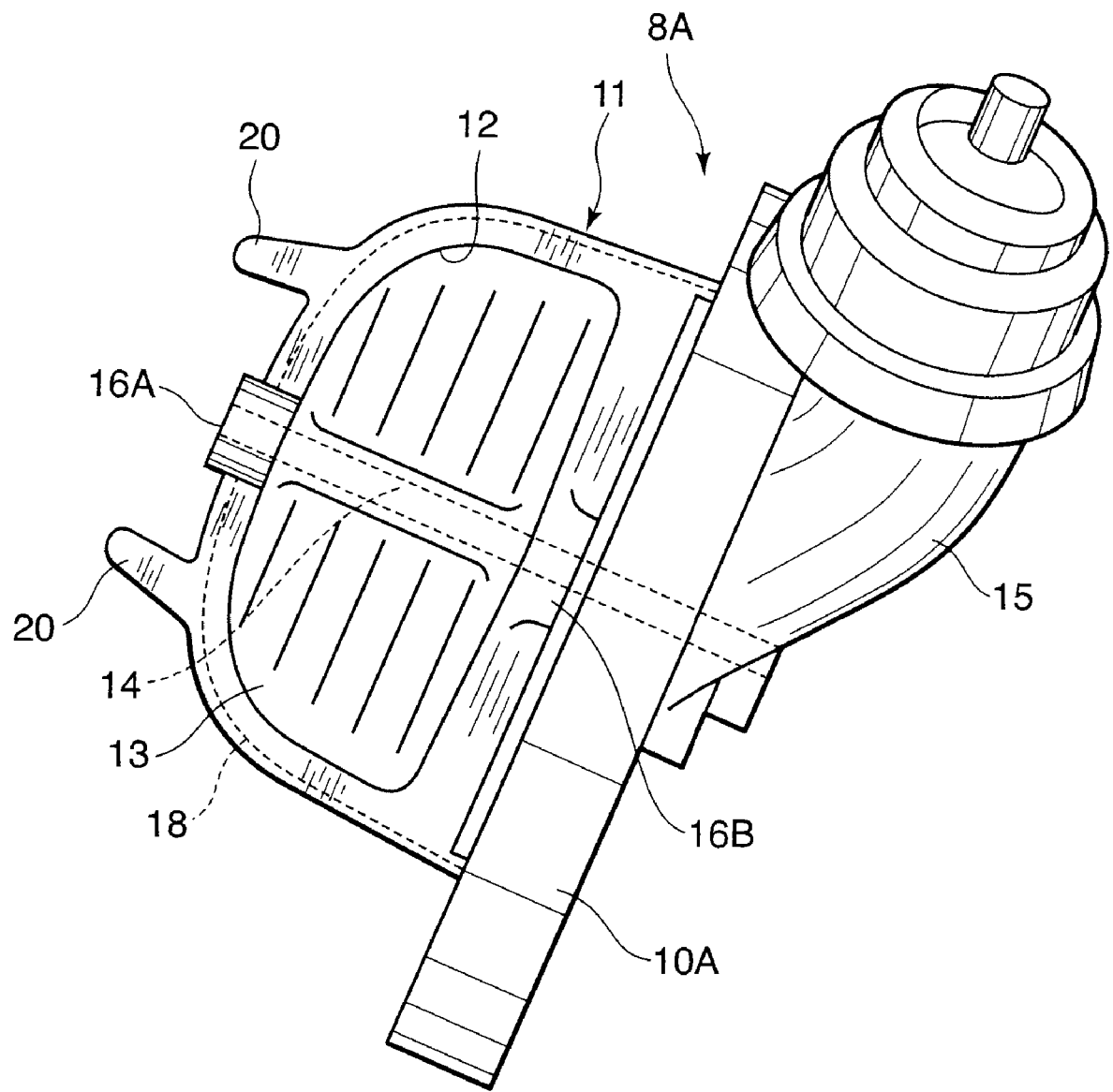
FIG. 4 is a plan view of the control valve unit.

Referring to FIG. 4, the first control valve 8A comprises a valve frame 11 projecting perpendicularly from the fixing flange 10A. The valve frame 11 is formed integrally with the fixing flange 10A by injection molding the same material as that used for the intake manifold 1.

A valve hole 12 is formed inside the valve frame 11. Within the valve hole 12, a valve body 13 which opens and closes the valve hole 12 is supported via a valve shaft 14.

The valve body 13 is a butterfly valve having an identical shape to the valve hole 12. The planar shape of the valve body 13 is basically rectangular, but two corners distant from the fixing flange 10A are curved with a large diameter. Further, a base side of the valve body 13 facing the fixing flange 10A inclines slightly towards the curved corners as a distance from the valve shaft 14 increases.

Referring again to FIG. 3, the valve shaft 14 is constructed integrally with the valve body 13. The tip of the valve shaft 14 is inserted into a bearing boss 16A formed on a crown portion of the valve frame 11 and supported by a bearing metal 17A so as to be free to rotate. The rear portion of the valve shaft 14 penetrates a bearing boss 16B formed on a base portion of the valve frame 11 and the fixing flange 10A, and supported by a bearing metal 17B fitted to the bearing boss 16B so as to be free to rotate. The rear end of the valve shaft 14 is supported by a thrust bearing 17C fixed to the fixing flange 10A.

Referring again to FIG. 4, the rear portion of the valve shaft 14 projecting outside from the fixing flange 10A is connected to a valve actuator 15 that is fixed to the fixing flange 10A. The valve actuator 15 rotates the valve shaft 14 according to signals input from outside, thereby rotating the valve body 13 to close and open the valve hole 12.

The outer shape of the valve frame 11 is substantially rectangular, but, similarly to the shape of the planar shape of the valve body 13, two corners distant from the fixing flange 10A are curved with a large diameter so as to constitute an arch structure. The inner circumference of the valve frame 11 defining the valve hole 12 has an identical shape to the outer shape of the valve body 13 such that the valve body 13 fits into the valve hole 12.

A groove 18 is formed on the outer circumference of the valve frame 11 except, for the base portion thereof, as shown by a broken line in the figure.

Figure 5:
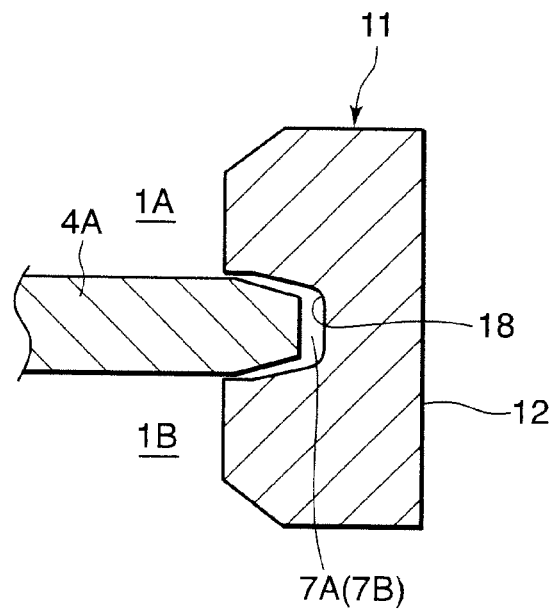
FIG. 5 is an enlarged vertical sectional view of an engaging part between a valve frame of the control valve unit and a partition between intake collectors, according to this invention.

Referring to FIG. 5, the groove 18 has a cross sectional shape whereby the width of the groove 18 gradually narrows towards the bottom. On the other hand, the edge of the partition 4A defining the first notch 7A has a tapered cross sectional shape gradually narrowing in width towards the tip. The edge of the partition 4A engages with the groove 18. The valve frame 11 is fitted to the partition 4A by inserting the edge of the partition 4A into the groove 18. The state of engagement between the edge of the partition 4A and the groove 18 is a so-called clearance fit.

Referring again to FIG. 3, the bearing boss 16A is formed into a cylindrical shape projecting from the valve frame 11 towards the partition 4A. In order to accommodate the bearing boss 16A, a depression 19 having a semi-circular cross sectional shape is formed on the edge of the partition 4A such that the lower part of the outer circumference of the bearing boss 16A is fitted into the depression 19.

Together, the clearance fit between the edge of the partition 4A and the groove 18 and the support structure for supporting the bearing boss 16A using the depression 19 bring about a so-called Labyrinth effect which helps to prevent air from leaking through the engaging part between the partition 4A and the valve frame 11.

Referring again to FIG. 4, on both sides of the bearing boss 16A, a pair of projections 20 pointing against the partition 4A are formed on the outer circumference of the valve frame 11.

Figure 6:
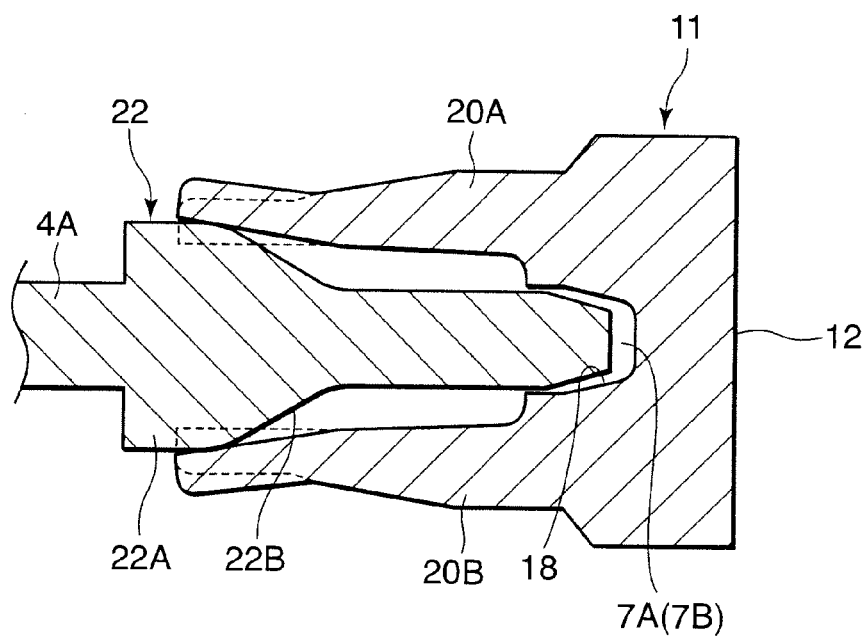
FIG. 6 is an enlarged vertical sectional view of an engaging part between a projection of the valve frame and the partition, according to this invention.

Referring to FIG. 6, the projection 20 comprises a pair of projecting members 20A and 20B which are disposed in parallel so as to be vertically spaced from one another. The projecting members 20A and 20B are each formed in a tapered shape gradually decreasing in thickness toward the tip. The projection direction of the projecting members 20A and 20B is parallel to the direction of the valve shaft 14.

On the edge of the partition 4A facing the projection 20, a thick portion 22 is formed at a slight retreat from the first notch 7A. The thick portion 22 comprises a base part 22A having a constant thickness and a tapered part 22B which gradually decreases in thickness towards the first notch 7A. The thickness of the base part 22A is slightly greater than the distance of the clearance between the projecting members 20A and 20B. The valve frame 11 is fitted to the partition 4A in such a state that the pair of projections 20 engage with the edge of the partition 4A whereby the thick portion 22 is gripped between the projecting members 20A and 20B which are elastically deformed upward and downward as shown by the solid line in FIG. 6. The broken line in the figure denotes the original shape of the projecting members 20A and 20B without deformation.

The first control valve 8A is fixed to the first notch 7A in the following manner.

Specifically, the first control valve 8A is first assembled as a first control valve unit by fitting the valve shaft 14, valve body 13 and actuator 15 onto the valve frame 11. As described above, the valve frame 11 is molded integrally with the fixing flange 10A by injection molding performed in advance.

Next, the valve frame 11 is inserted into the first notch 7A of the partition 4A from a side opening of the collector part 4 onto which the flange 9A is fixed in advance while fitting the edge of the partition 4A defining the first notch 7A into the groove 18. Once a part of the edge of the partition 4A is engaged with the groove 18, the valve frame 11 is then guided by the edge of the partition 4A towards the end of the first notch 7A. Due to the clearance fit between the edge of the partition 4A and the groove 18, a deforming load is not exerted on the valve frame 11 when it is inserted into the first notch 7A, and therefore the valve frame 11 advances smoothly into the first notch 7A.

The valve frame 11 is inserted into the first notch 7A until the projecting members 20A and 20B of the pair of projections 20 grip the edge of the partition 4A. When the valve frame 11 reaches this position, the fixing flange 10A is secured onto the flange 9A of the collector part 4 by bolts.

When the projecting members 20A and 20B grip the edge of the partition 4A, a resistance force acts on the advancing valve frame 11 accompanying elastic deformation of the projecting members 20A and 20B. Since the valve frame 11 is formed into an arch structure as described above, most of the resistance force is supported by the fixing flange 10A via leg portions of the valve frame 11. Since a part of the resistance force acts on the valve shaft 14 via the bearing boss 16A, the valve shaft 14 is supported by the thrust bearing 17C fixed to the fixing flange 10A.

According to this fixing structure, the first control valve 8A is assembled into the collector part 4 without deforming the valve frame 11 and without exerting a load on the valve body 13. It should be noted that the arch structure of the valve frame 11 increases the rigidity of the valve frame 11 against the deformation pressure exerted by the projections 20.

The second control valve 8B is fixed to the second notch 7B in the same way as the first control valve 8A is fixed to the first notch 7A, described above.

The first control valve 8A thus fixed to the first notch 7A operates between a closed position where the valve body 13 is maintained in an identical plane as the valve frame 11 as shown in FIG. 4 and an open position where the valve body 13 is maintained perpendicular to the valve frame 11 as shown in FIG. 3 by causing the actuator 15 to rotate the valve body 13 ninety degrees.

Since the shape of the valve frame 11 does not change before and after the first control valve 8A is fitted into the first notch 7A, the clearance between the valve frame 11 and the valve body 13 can be set to a minimum clearance without considering the deformation of the valve frame 11. Thus, the valve hole 12 can be closed by the valve body 13 with high precision.

With respect to the engagement between the valve frame 11 and the partition 4A, a Labyrinth effect is brought about by the clearance fit between the edge of the partition 4A and the groove 18 as well as the engagement between the bearing boss 16A and the depression 19. Owing to this Labyrinth effect, air leakage between the intake collectors 1A and 1B via the engaging part between the valve frame 11 and the partition 4A is efficiently prevented.

According to this invention, therefore, the air blocking performance of the first control valve 8A and the second control valve 8B between the intake collectors 1A and 1B can be improved by a simple construction.

A pair of projections 20 elastically gripping the edge of the partition 4A by the projecting members 20A and 20B prevent relative oscillation between the partition 4A and the valve frame 11. Vibration of the internal combustion engine transmitted from the intake manifold 1 is therefore prevented from causing relative oscillation between the partition 4A and the valve frame 11, and noise due to relative oscillation therebetween is also prevented.

Further, the first control valve 8A can be fixed to the collector part 4 only by inserting the valve frame 11 into the first notch 7A until the projections 20 grip the edge of the partition 4A. Therefore, no special operation is required to cause the projections 20 to grip the edge of the partition 4A. This also applies when fixing the second control valve 8B. Hence, installation of the control valves 8A and 8B into the collector part 4 is made easy.

The contents of Tokugan 2006-013533, with a filing date of Jan. 23, 2006 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in the embodiment described above, the projections 20 are formed on the valve frame 11, but it is possible to form the projections on the edge of the partitions 4A so as to grip the valve frame 11. Further, the projection 20 is constituted by the pair of projecting members 20A and 20B, but it is also possible to grip the edge of the partition 4A between a single projecting member formed on the inner surface of the groove 18 and a wall surface of the groove 18 facing the single projecting member.

In the embodiment described above, a pair of projections 20 are provided on both sides of the bearing boss 16A, but it is possible to provide a sole projection which extends beyond the bearing boss 16 instead of the pair of projections 20. What is important in this invention is not the number of the projections, but that a projection is provided on both sides of the bearing boss 16.

In the embodiment described above, the intake collectors 1A, 1B are separated by the partition 4A, and the first control valve 8A and the second control valve 8B are fitted to the partition 4A. However, this invention is applicable also to a device in which a pair of intake collectors are connected by a connection pipe, and a partition and a control valve are provided in the connection pipe.

The embodiments of this invention in which an exclusive property or privilege is claimed are defined as follows:

The embodiments of this invention in which an exclusive property or privilege is claimed are defined as follows:

1. A variable intake device for a multi-cylinder internal combustion engine, comprising:
   a pair of intake collectors respectively branching off branch pipes to cylinders;
   a partition which separates the intake collectors;
   a valve which connects the pair of intake collectors, wherein the valve is fitted onto the partition via a valve frame and a bearing boss provided on the valve frame, and one of the partition and the valve frame has a groove to engage with an edge of the other of the partition and the valve frame; and
   a pair of projections projecting from the groove against the edge on both sides of the bearing boss, wherein each of the projections comprises a pair of projecting members which are vertically spaced from one another to grip the edge therebetween vertically in a state where the groove is engaged with the edge and the pair of projecting members are deformed in a direction to be directed away from from each other in a state where the edge is gripped between the pair of projecting members.

2. The variable intake device as defined in claim 1, wherein the valve frame has the groove and the partition has the edge.

3. The variable intake device as defined in claim 2, wherein the partition comprises a thick portion which expands the projecting members when inserted therebetween.

4. The variable intake device as defined in claim 2 wherein the valve comprises a valve shaft supported to be free to rotate by the bearing boss, and the pair of projections are disposed in parallel with the valve shaft.

5. The variable intake device as defined in claim 4, wherein the pair of intake collectors are formed in a common housing, and the valve frame is constructed integrally with a fixing flange which is fixed to an opening of the housing.

6. The variable intake device as defined in claim 5, wherein the valve shaft penetrates the fixing flange and is connected to an actuator disposed outside the fixing flange.

7. The variable intake device as defined in claim 1, wherein the valve frame has an arch structure supporting an elastic member.

8. The variable intake device as defined in claim 1, wherein the valve is fitted onto the partition as a valve unit in which the valve is fitted onto the valve frame in advance.

9. The variable intake device as defined in claim 1, wherein the valve comprises a butterfly valve which rotates within the valve frame to connect or disconnect the pair of the intake collectors.

10. The variable intake device as defined in claim 1, wherein the valve frame includes a base and a tip, wherein the base is located adjacent to an opening in the intake collectors for the valve, wherein the projections project from the tip of the valve frame.

11. The variable intake device as defined in claim 10, wherein the bearing boss is located on the tip of the valve frame and is configured to engage with the partition.

12. The variable intake device as defined in claim 10, wherein the projections are located adjacent to and on both sides of the bearing boss.

13. The variable intake device as defined in claim 1, wherein the pair of projecting members grip the edge between the pair of projecting members such that the edge projects between the pair of projecting members.

* * * * *